I. J. FELLEMAN.
MILK POWDERING MACHINE.
APPLICATION FILED APR. 30, 1917.
1,239,471.
Patented Sept. 11, 1917.
4 SHEETS—SHEET 4.
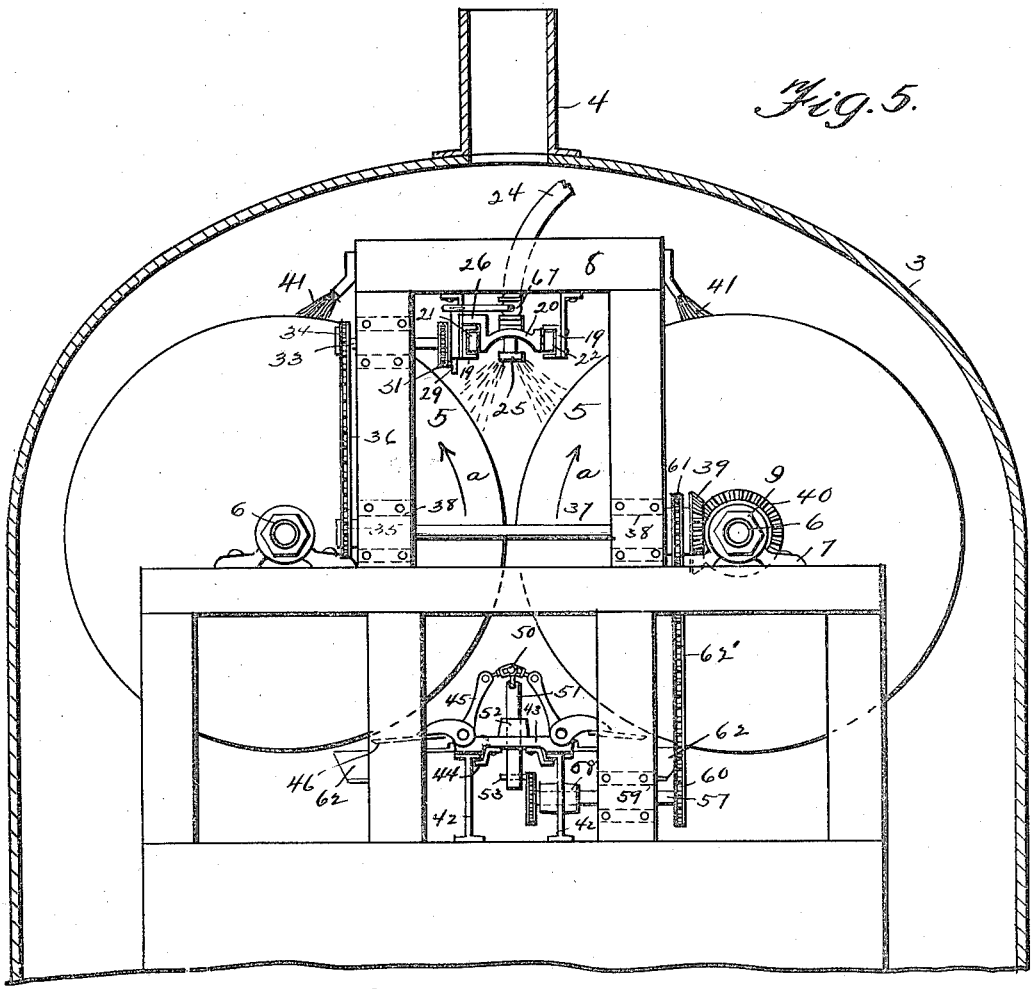
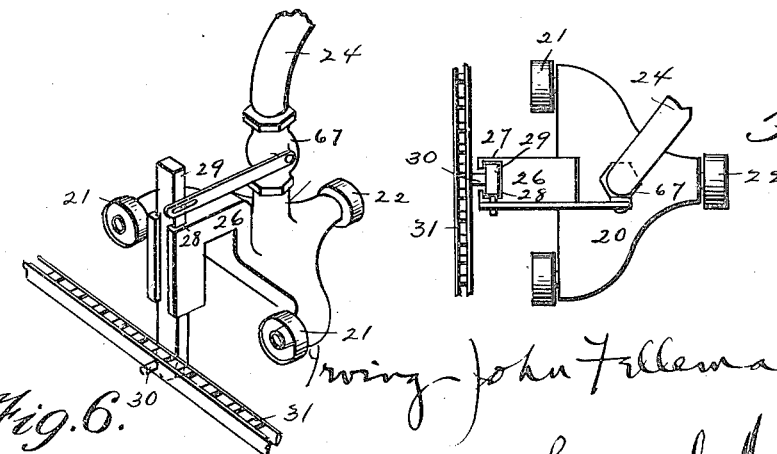

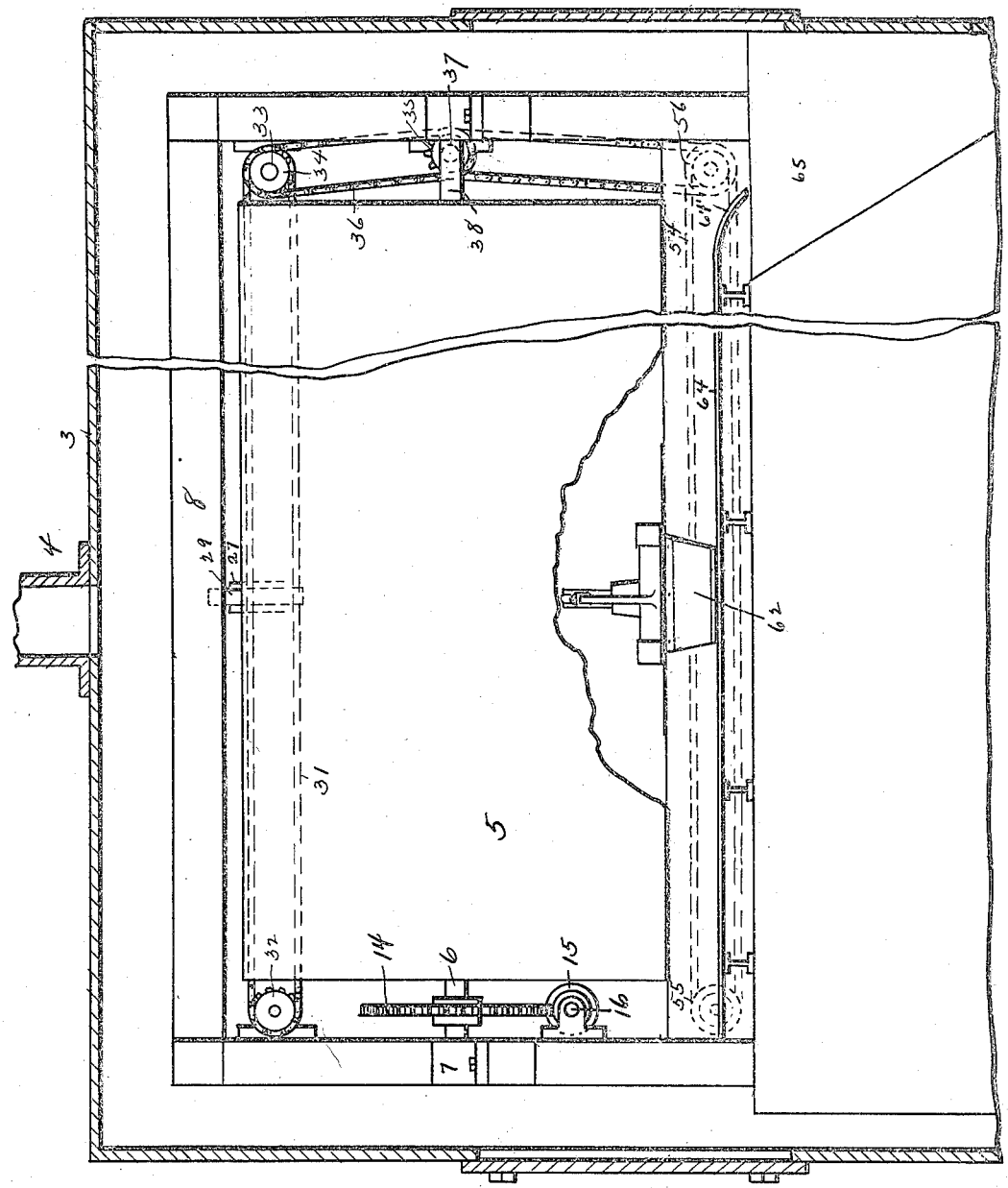

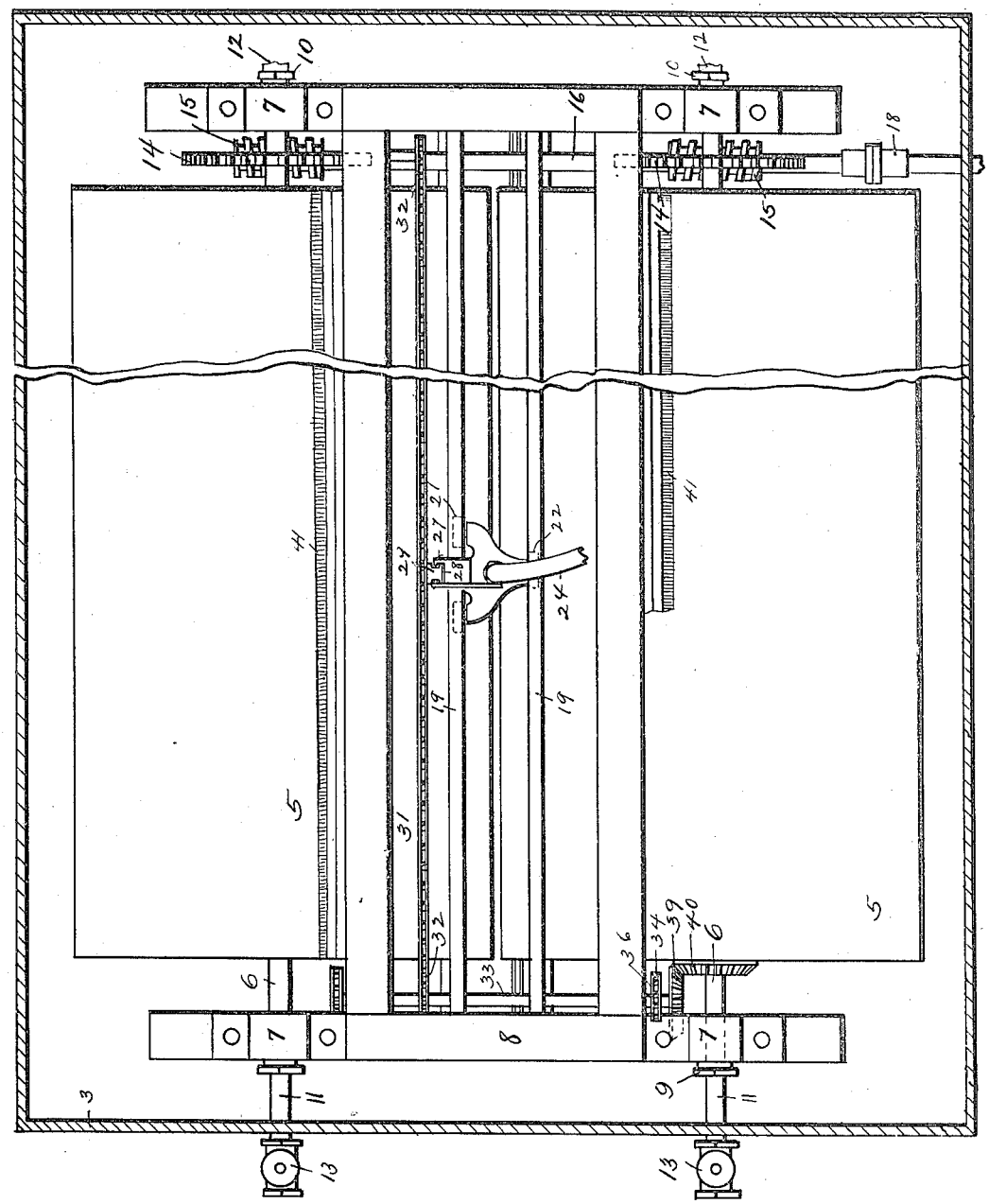

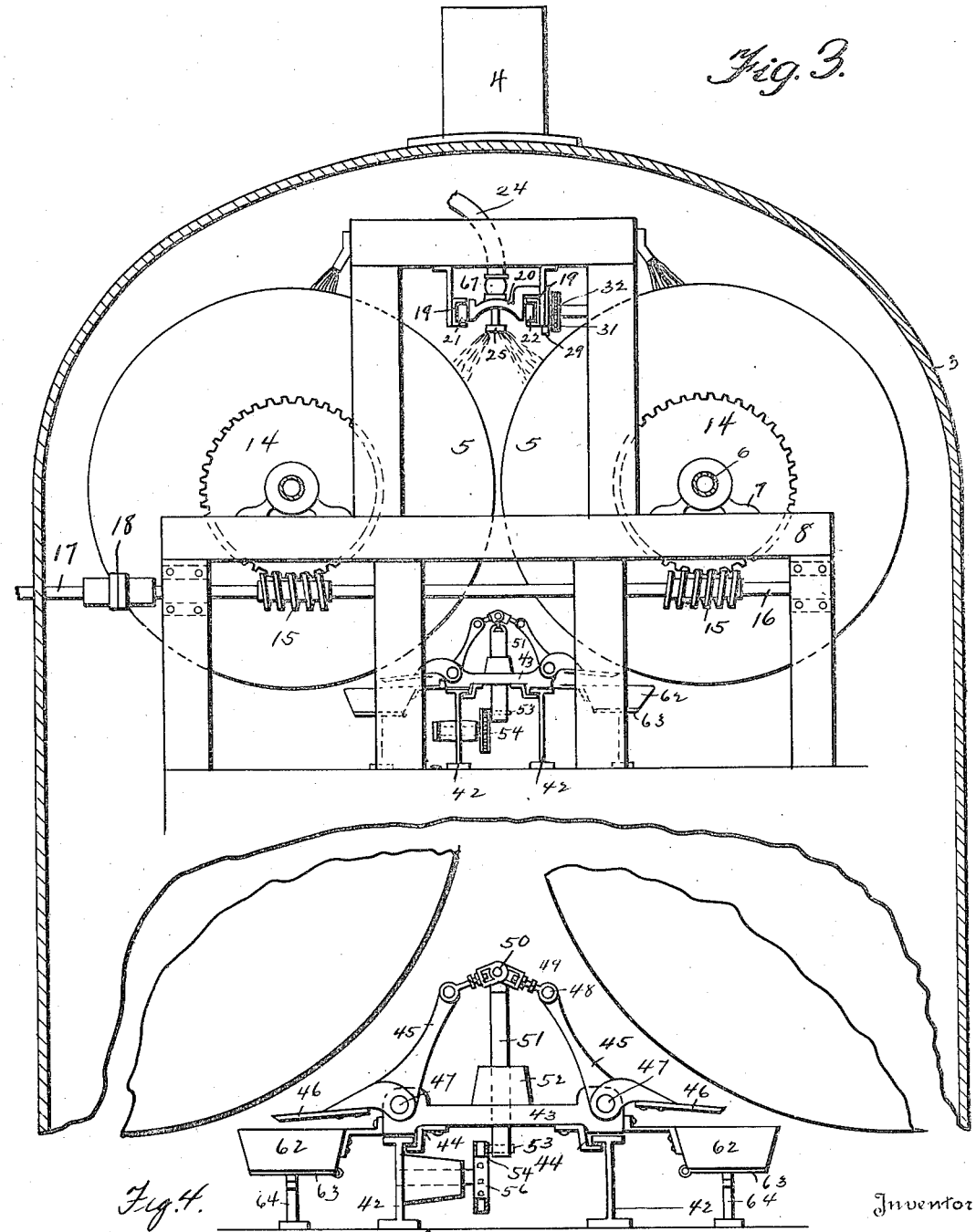

UNITED STATES PATENT OFFICE.

IRVING JOHN FELLEMAN, OF GRIDLEY, CALIFORNIA.

MILK-POWDERING MACHINE.

1,239,471.   Specification of Letters Patent.   Patented Sept. 11, 1917.

Application filed April 30, 1917. Serial No. 165,603.

*To all whom it may concern:*

Be it known that I, IRVING JOHN FELLEMAN, a citizen of the United States, residing at Gridley, California, in the county of Butte and State of California, have invented certain new and useful Improvements in Milk-Powdering Machines, of which the following is a specification.

This invention relates to a milk powdering machine and it has for its object the provision of simple and efficient mechanism whereby milk may be rapidly and economically reduced to powdered form through the medium of entirely automatic mechanism and in a substantially continuous operation.

In a general way the machine comprises rotative, heated rolls or cylinders and spray and planer carriages traveling in such proximity thereto that milk from the spray carriage is sprayed upon the heated rolls as the carriage travels endwise with respect to the rolls and is planed from the rolls by the knives of the planer carriage during the travel of the latter endwise with respect to the rolls, the milk thus planed from the rolls falling into a suitable receptacle movable with the planer carriage and which receptacle automatically discharges its contents at stated intervals.

Further objects and advantages of the invention will be set forth in the detailed description which now follows.

In the accompanying drawings,

Figure 1 is a side elevation of an apparatus constructed in accordance with the invention with the inclosing housing in section and with certain of the parts broken away and with other parts omitted to preserve the clearance of the drawings.

Fig. 2 is a plan view of an apparatus constructed in accordance with the invention.

Fig. 3 is an end view of the parts at one end of the machine.

Fig. 4 is an enlarged, detail view of the planer carriage.

Fig. 5 is an end view of the parts at the other end of the machine.

Fig. 6 is a perspective view of the spray carriage.

Fig. 7 is a plan view of the spray carriage.

Like numerals designate corresponding parts in all of the figures of the drawings.

In carrying out the invention I provide a housing 3 for the machine, which housing is provided with a vent 4 through which steam from the rolls may be carried outside of the building in which the apparatus is located. The machine proper comprises a pair of rolls 5 mounted upon hollow shafts 6 that are journaled in bearings 7 carried by the frame 8. The opposite ends of the shafts 6 are provided with stuffing boxes 9 and 10 through which inlet pipes 11 and outlet pipes 12 respectively pass. The inlet pipes 11 supply steam to the interior of the rolls 5 for the purpose of heating the same and these inlet pipes are provided with thermostatic valves 13 of the usual and well known type, the function of which valves is to maintain the live steam in the rolls at a predetermined temperature. The temperature employed by me is preferably between 170 and 175 degrees. This, in conjunction with the fact that I employ comparatively heavy boiler plate iron for the rolls, renders it possible to maintain the rolls at a considerable temperature. The thickness of the iron gives such body to the surfaces upon which the milk is to be sprayed that the heat is not readily lost during the spraying operation.

The rolls 5 are driven by worm wheels 14 and worms 15, the latter being mounted upon a transverse shaft 16 that receives its motion from a driving shaft 17. The driving shaft 17 is connected to the shaft 16 by means of a friction clutch 18 of any usual and well known type.

Channel irons 19 extend longitudinally above the rolls 5 and are supported by the end members of the frame 8. These channel irons constitute a track for the spray carriage 20, said spray carriage being provided with wheels 21 and 22 which travel upon the lower flights of the channel irons 19. The spray carriage 20 has a spray hose 24 connected thereto which is provided with a spray nozzle 25 through which the milk is sprayed upon the rolls 5 as the carriage travels endwise with respect to said rolls. It is to be understood that the milk is supplied through the hose 24 under pressure from any suitable source, it being apparent that it is a mere matter of choice as to whether this milk is received from an elevated tank by gravity or whether it is received from a tank, the contents of which are under pressure, or whether it is supplied to the hose 24 directly from a pump.

The spray carriage is provided with an angular neck extension 28 which projects beyond the track formed by the channel irons 19 at one side of said track and is provided at its extremity with a vertical extension 27 having a channel 28 formed therein in which a plunger 29 is disposed. This plunger is engaged by a pin 30 on a sprocket chain 31, said sprocket chain passing over sprocket wheels 32 disposed at the opposite ends of the machine.

One of the sprocket wheels 32 is driven from a shaft 33, said shaft being in turn driven by sprocket wheels 34 and 35 and a sprocket chain 36 from a transverse shaft 37 that is mounted in bearings 38 of the frame 8. The shaft 37 carries a bevel gear wheel 39 which meshes with a corresponding bevel gear wheel 40 upon one of the shafts 6. It will, therefore, be apparent that as the rolls 5 rotate, the sprocket chain 31 will be continuously driven and that this will impart longitudinal reciprocation to the spray carriage due to the engagement of the pin 30, which projects laterally from the chain 31, with the plunger 29. The engagement of the plunger 29 in the groove or recess 28 permits the pin 30 to pass downwardly around one of the sprockets 32 at one end of its travel and upwardly around the other sprocket at the other end of its travel while at the same time maintaining the engagement of said pin and consequently maintaining the engagement of the chain with the spray carriage so that the spray carriage is, as before stated, caused to move back and forth over the rolls 5.

The milk sprayed upon the rolls 5 is evenly spread out or distributed by means of brushes 41, said brushes bearing upon the upper faces of the rolls and extending substantially the full length of said rolls. The rolls are caused to rotate in the direction indicated by the arrows $a$ and it will, therefore, be apparent that these brushes will serve to smoothly and evenly distribute the milk upon the rolls.

I beams 42 are disposed longitudinally beneath the rolls 5 and constitute a track for a planer carriage 43, said planer carriage being held in operative relation with the upper flange of the I beams by means of keepers 44. The shanks 45 of planer knives 46 are pivoted at 47 to the carriage 43, and the upper ends of these shanks are pivotally connected at 48 to toggle links 49, said links in turn being connected at 50 to the upper end of a plunger 51. The plunger 51 is angular in cross section and slides through a bearing 52 carried by the planer carriage 43. A pin 53 projects laterally from a sprocket chain 54 and engages the plunger 51 in much the same manner as described with respect to the plunger of the spray carriage. The sprocket chain 54 passes over sprocket wheels 55 and 56, the sprocket wheel 55 deriving its movement from a transverse shaft 57. The shaft 57 is mounted in bearings 58 and 59 of one of the I beams and of the frame 8, respectively. The shaft 57 is driven by sprocket wheels 60 and 61 and a sprocket chain 62' from the transverse shaft 37 hereinbefore described. The engagement of pin 53 with the plunger 51 not only results in imparting endwise movement to the planer carriage 43 but it results in disengaging the planer knives 46 from engagement with the surfaces of the rolls 5 during the travel of the planer carriage in one direction and in forcing the planer knives into firm contact with the surfaces of the rolls during the travel of the planer carriage in the other direction. Projecting laterally from the planer carriage 43 and underlying the planer knives 46 are buckets 62 which receive the crystallized milk as it is planed from the rolls. These buckets are provided with hinged bottoms 63 held in an elevated position close to the bottoms of the buckets during the cutting action of the knives 46, by rails 64 which extend substantially the full length of the machine and dip downwardly at 64' to permit the bottoms of the buckets to fall and discharge the contents of the same when the planer carriage reaches the end of its stroke or travel. These buckets are arranged to discharge into a hopper of a mill, not shown, the function of which is to reduce the crystallized milk to powdered form.

The movement of the several parts is so timed that the spray carriage travels slightly in the rear of the planer carriage so that during the spraying operation the planer knives are acting to remove the milk sprayed upon the rolls during the preceding trip of the spray carriage.

The speed of the several parts is such that the milk is not maintained in contact with the heating rolls long enough to destroy its solubility in water or to injuriously affect the albumin or caseins in the milk. Upon the contrary, the milk is maintained in contact with the rolls through such a period, and the temperature is so adjusted that the milk when removed from the rolls is still in a slightly moist condition. However, the action of the air upon the crystallized milk when it falls into the buckets quickly dries the product and renders it ready to be reduced to powdered form by the mill, the hopper of which is indicated at 65. This machine will produce a practical powdered milk, soluble in water and having all of the properties of fresh milk. It will keep indefinitely in any climate and can be converted into fresh milk ready for use by the mere addition of water thereto. The product has no foreign taste or flavor but corresponds in all respects with fresh cows' milk when water is added thereto.

While I may if desired cause the spray to be discharged upon the rolls 5 during the movement of the spray carriage in both directions, I also contemplate the provision of means for cutting off the spray during the movement of the carriage in one direction. This I accomplish by interposing a valve 67 in the spray hose 24 and connecting the stem of this valve with the plunger 29 as indicated in Fig. 6 with the result that when the plunger is in one position the valve will be closed and when the plunger is in the other position the valve will be open.

While the elements shown and described are well adapted to serve the purposes for which they are intended it is to be understood that the invention is not limited to the precise construction set forth but that it includes within its purview such changes as fairly come within the spirit of the appended claims.

Having described my invention what I claim is:—

1. A machine of the character described comprising a pair of heated rolls, means for spraying milk thereon and a planer carriage disposed centrally beneath said rolls and mounted to travel longitudinally thereof, said planer carriage carrying planer knives which are mounted to engage said rolls, a vertically movable plunger in said planer carriage, shanks for the planer knives, link connections between the shanks and the vertically movable plunger and means for automatically moving said plunger at each of the limits of travel of the planer carriage to thereby throw the knives into and out of engagement with the rolls.

2. A device of the character described comprising a heated roll, a planer carriage, a receptacle movable therewith, a planer knife disposed in such relation to the receptacle that the products discharged by the knife are received by the receptacle, means for automatically discharging the receptacle at the end of limit of travel of the planer carriage and means for automatically moving the planer knife into and out of engagement with the roll.

3. The combination in a milk powdering machine, of a heated roll, a planer carriage, a bucket bodily movable therewith, a hinged bottom for the bucket, means for automatically opening the hinged bottom at the limit of travel of the planer carriage and means carried by the planer carriage for coacting with the heated roll.

4. The combination with a planer carriage, of a receptacle bodily movable therewith, a hinged bottom for said receptacle, a rail which holds the hinged bottom in an elevated position until the planer carriage reaches the end of its limit of movement and which then permits the hinged bottom to fall to discharge the contents of the receptacle, a heated roll and knife carried by the planer carriage for engaging said roll.

5. In a milk powdering machine, the combination with a spray carriage, a discharge nozzle, a valve controlling the flow of milk to the discharge nozzle, a vertically movable plunger carried by the spray carriage, a chain having a transverse extension engaging said plunger and connections between said plunger and the valve for opening the valve when the plunger moves in one direction and closing the valve when the plunger moves in the opposite direction.

6. A machine of the character described comprising a pair of heated rolls, means for spraying milk thereon and a planer carriage disposed centrally beneath said rolls and mounted to travel longitudinally thereof, said planer carriage carrying planer knives which project in opposite directions from the planer carriage and engage said rolls.

In testimony whereof I affix my signature in the presence of two witnesses.

IRVING JOHN FELLEMAN.

Witnesses:
HENRY INGRAM,
AVIS E. BIVENS.